US012639437B2

(12) United States Patent
Cosentino et al.

(10) Patent No.: US 12,639,437 B2
(45) Date of Patent: May 26, 2026

(54) MITIGATING RANSOMWARE ACTIVITY OF A HOST SYSTEM USING A KERNEL MONITOR

(71) Applicant: Red Hat, Inc., Raleigh, NC (US)

(72) Inventors: Andrea Cosentino, Rome (IT); Paolo Antinori, Novara (IT)

(73) Assignee: Red Hat, Inc., Raleigh, NC (US)

( * ) Notice: Subject to any disclaimer, the term of this patent is extended or adjusted under 35 U.S.C. 154(b) by 120 days.

(21) Appl. No.: 18/531,073

(22) Filed: Dec. 6, 2023

(65) Prior Publication Data

US 2025/0190558 A1 Jun. 12, 2025

(51) Int. Cl.
*G06F 21/56* (2013.01)

(52) U.S. Cl.
CPC ...... *G06F 21/566* (2013.01); *G06F 2221/034* (2013.01)

(58) Field of Classification Search
None
See application file for complete search history.

(56) References Cited

U.S. PATENT DOCUMENTS

| | | | | | |
|---|---|---|---|---|---|
| 10,503,904 | B1 * | 12/2019 | Singh | | G06F 21/566 |
| 10,972,503 | B1 * | 4/2021 | Mohan | | H04L 63/14 |
| 11,361,077 | B2 * | 6/2022 | Saffar | | G06F 21/552 |
| 12,511,202 | B2 * | 12/2025 | Mittal | | G06F 11/1469 |
| 2011/0126205 | A1 * | 5/2011 | Gaist | | G06F 21/554 |
| | | | | | 718/103 |

| | | | | | |
|---|---|---|---|---|---|
| 2015/0332043 | A1 * | 11/2015 | Russello | | G06F 11/3466 |
| | | | | | 726/22 |
| 2018/0032728 | A1 * | 2/2018 | Spisak | | G06F 21/00 |
| 2018/0075234 | A1 * | 3/2018 | Boutnaru | | G06F 21/554 |
| 2020/0366708 | A1 * | 11/2020 | Raghunathan | | H04L 63/20 |
| 2021/0089647 | A1 * | 3/2021 | Suwad | | G06F 21/552 |
| 2021/0349748 | A1 * | 11/2021 | Dunfey | | G06F 3/065 |
| 2022/0147542 | A1 * | 5/2022 | Asgar | | G06F 11/323 |
| 2023/0078476 | A1 * | 3/2023 | Venkatachalam | | G06F 21/566 |
| | | | | | 726/24 |
| 2023/0141909 | A1 * | 5/2023 | Truscott | | G06F 11/1469 |
| | | | | | 726/23 |
| 2023/0222222 | A1 * | 7/2023 | Pagnozzi | | G06F 8/65 |
| | | | | | 726/22 |
| 2023/0350858 | A1 * | 11/2023 | Karr | | G06F 3/0664 |
| 2023/0367628 | A1 * | 11/2023 | Avadhanam | | H04L 63/145 |
| 2024/0086558 | A1 * | 3/2024 | Jadhav | | G06F 21/6218 |

(Continued)

*Primary Examiner* — Michael Pyzocha

(74) *Attorney, Agent, or Firm* — Kilpatrick Townsend & Stockton LLP

(57) ABSTRACT

A kernel monitor can be used to mitigate ransomware activity of a host system. In some aspects, a computing system can use the kernel monitor to monitor a set of system calls generated by the host system within a time window to perform a functionality. The kernel monitor can include a respective kernel program monitoring each system call in the set of system calls. The set of system calls can be filtered by the kernel monitor to identify a subset of system calls associated with encrypting a filesystem of the host system. The computing system can determine that the subset of system calls is indicative of ransomware activity associated with the host system based on the subset of system calls exceeding a predefined threshold. Subsequently, the computing system can perform a mitigation operation to mitigate the ransomware activity.

20 Claims, 6 Drawing Sheets

100

(56) References Cited

U.S. PATENT DOCUMENTS

| | | | |
|---|---|---|---|
| 2024/0134760 A1* | 4/2024 | Thomas | G06F 11/0793 |
| 2024/0160504 A1* | 5/2024 | Seshadri | G06F 11/3466 |
| 2024/0193049 A1* | 6/2024 | Weissman | G06F 9/45558 |
| 2024/0202020 A1* | 6/2024 | McKee | G06F 9/45558 |
| 2024/0273192 A1* | 8/2024 | Avadhanam | G06F 21/54 |
| 2024/0303322 A1* | 9/2024 | Sic | G06F 21/554 |
| 2024/0330458 A1* | 10/2024 | Strogov | G06F 21/566 |
| 2024/0330461 A1* | 10/2024 | Ezrielev | G06F 21/566 |
| 2024/0385865 A1* | 11/2024 | Fonseca | G06N 20/00 |
| 2024/0411914 A1* | 12/2024 | Bacha | G06F 21/6218 |
| 2025/0004913 A1* | 1/2025 | Czerninski | G06F 11/3612 |
| 2025/0036762 A1* | 1/2025 | Nanivadekar | G06F 21/568 |
| 2025/0036763 A1* | 1/2025 | Vijayvargiya | G06F 21/566 |
| 2025/0175498 A1* | 5/2025 | Strogov | H04L 63/1466 |
| 2025/0190558 A1* | 6/2025 | Cosentino | G06F 21/554 |

* cited by examiner

Figure 4:
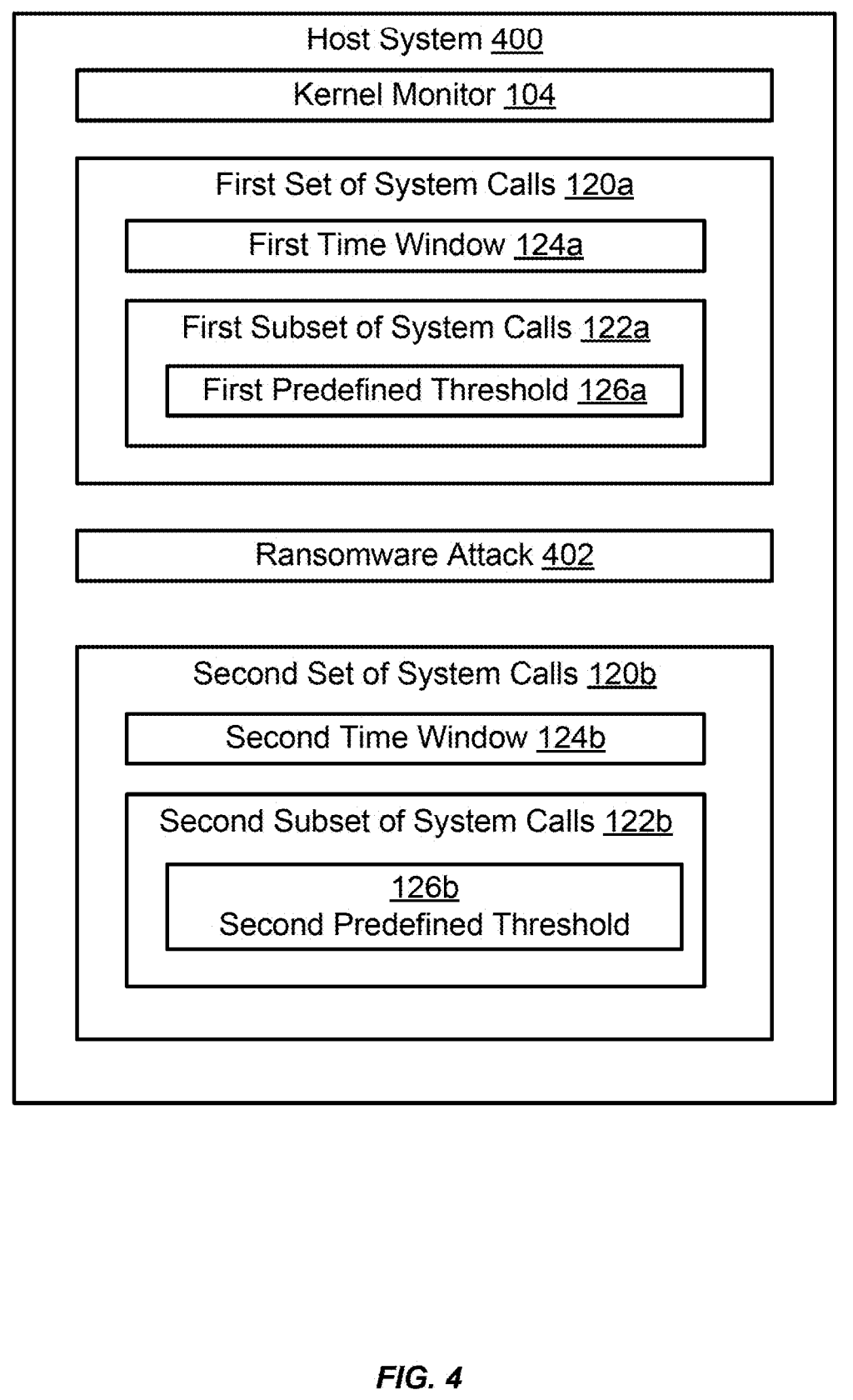

Host System 400

Kernel Monitor 104

First Set of System Calls 120a

First Time Window 124a

First Subset of System Calls 122a

First Predefined Threshold 126a

Ransomware Attack 402

Second Set of System Calls 120b

Second Time Window 124b

Second Subset of System Calls 122b

126b
Second Predefined Threshold

602
Monitor, using a kernel monitor of a host system, a set of system calls generated by the host system within a time window to perform a functionality

604
Filter, by the kernel monitor, the set of system calls to identify a subset of system calls associated with encrypting a filesystem corresponding to the host system

606
Determine that the subset of system calls is indicative of ransomware activity associated with the host system based on the subset of system calls exceeding a predefined threshold

608
Subsequent to determining that the subset of system calls is indicative of the ransomware activity, perform a mitigation operation to mitigate the ransomware activity

*FIG. 6*

MITIGATING RANSOMWARE ACTIVITY OF A HOST SYSTEM USING A KERNEL MONITOR

TECHNICAL FIELD

The present disclosure relates generally to information security and intrusion detection. More specifically, but not by way of limitation, this disclosure relates to mitigating ransomware activity of a host system using a kernel monitor.

BACKGROUND

Cyber-attacks are an ever-increasing problem in today's digitally connected world. Cyber-attacks can take on a variety of forms, such as denial of service (DOS) attacks; attacks involving viruses, Trojans, worms, or ransomware; and intrusion attempts. Ransomware attacks can involve encrypting critical files of a computing device, thereby compromising performance or security of the computing device. To combat cyber-attacks, organizations can employ hardware-based or software-based cyber-security tools, such as firewalls, intrusion detection systems, or antivirus software.

BRIEF DESCRIPTION OF THE DRAWINGS

FIG. 4 is a block diagram of an example of a host system including a first set of system calls generated within a first time window and a second set of system calls generated within a second time window according to some aspects of the present disclosure.

FIG. 6 is a flowchart of a process for mitigating ransomware activity of a host system using a kernel monitor according to some aspects of the present disclosure.

DETAILED DESCRIPTION

Figure 1:
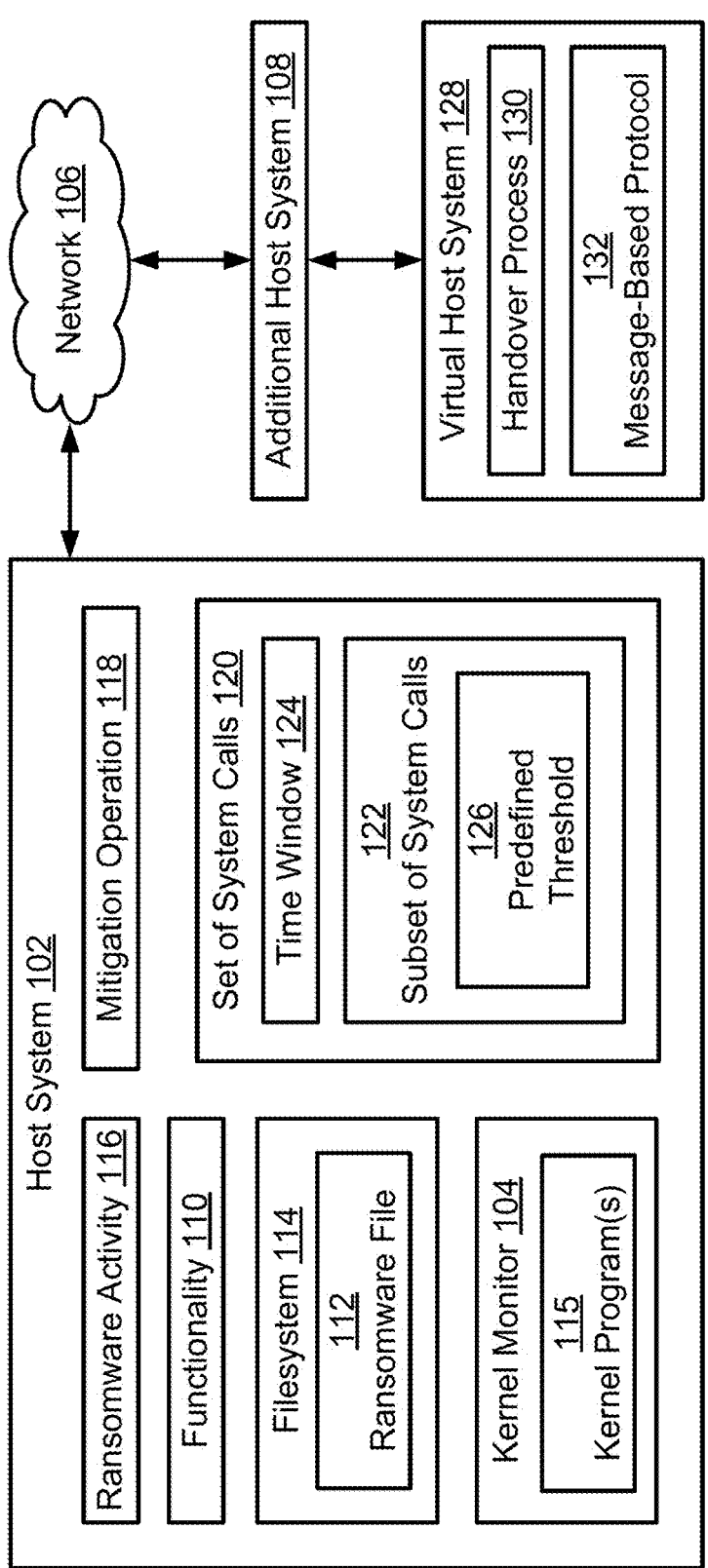
FIG. 1 is a block diagram of an example of a computing system for mitigating ransomware activity of a host system using a kernel monitor according to some aspects of the present disclosure.

A host system, such as a server, can be part of a computing system used to control one or more hardware systems. The host system can be communicatively coupled to other components of the computing system via a computer network, such as the Internet, thereby increasing an attack surface of the host system of the computing. Using the computer network, a malicious actor can distribute ransomware that can encrypt a filesystem of the host system to prevent access to critical files stored in the filesystem. The critical files can be used to perform one or more functionalities associated with the hardware systems. The malicious actor may restrict the access to the critical files until a ransom is provided to the malicious actor. In some cases, if the ransomware remains undetected in the host system, the ransomware can spread, such as via the computer network, to affect the other components of the computing system. Thus, the ransomware can compromise performance and safety of the hardware systems controlled by the computing system.

Some examples of the present disclosure can overcome one or more of the issues mentioned above by using a kernel monitor to detect ransomware activity affecting a host system of a computing system. The kernel monitor can monitor one or more system calls of the host system and identify abnormal behavior with respect to system calls the associated with the host system. In particular, the kernel monitor can identify a subset of the system calls generated within a predefined time window that are associated with encryption or decryption of a filesystem corresponding to the host system. If the kernel monitor determines that the subset of the system calls is above a predefined threshold, the kernel monitor can flag the host system corresponding to the subset of the system calls as being indicative of ransomware activity.

In some cases, once the kernel monitor detects the ransomware activity, the kernel monitor can implement a mitigation operation to mitigate the ransomware activity. For instance, the kernel monitor can isolate the host system to prevent ransomware affecting the host system from migrating or spreading to other components of the computing system associated with the host system. In some implementations, the mitigation operation may involve identifying a ransomware file in the filesystem that is associated with the ransomware activity. Once the ransomware file is identified, the computing system can isolate the ransomware file to prevent the ransomware file from affecting the host system or the other components of the computing system.

In additional or alternative cases, the kernel monitor can continue monitoring the subset of the system calls over one or more additional time windows. The kernel monitor can identify an additional subset of the system calls that occurred during the additional time windows and are associated with encryption or decryption of the filesystem corresponding to the host system. After identifying the additional subsets of the system calls, the kernel monitor can use another predefined threshold associated with the additional time windows to determine whether a ransomware attack has occurred. For instance, if the additional subset of system calls is above the other predefined threshold, the kernel monitor can flag the host system as being indicative of a ransomware attack. The computing system then can implement a suitable mitigation operation to address or resolve the ransomware attack.

In one particular example, an extended Berkeley Packet Filter (eBPF) probe can function as a kernel monitor associated with an electronic control unit (ECU) that can be part of an electronic system to control one or more electrical systems in a vehicle. The electronic system can include multiple ECUs that are communicatively coupled to each other and that each control a particular electrical system of the vehicle. The eBPF probe can monitor one or more system calls that are associated with the ECU and that were generated during a particular time window. In some implementations, the eBPF probe can identify a subset of the system calls that is associated with encrypting one or more files in a filesystem of the ECU. For instance, the subset of the system calls can correspond to accessing an encryption library to encrypt the files stored in the filesystem. If the subset of the system calls is above a predefined threshold associated with a quantity of the subset, the host system can be flagged as being indicative of ransomware activity.

Once the ransomware activity is identified, the electronic system can implement a mitigation operation to mitigate the ransomware activity. In some cases, the electronic system may generate a software-emulated ECU as a virtualized version of the ECU to replace the ECU. For instance, the software-emulated ECU may temporarily replace the ECU with respect to controlling a particular electrical system used to perform a particular functionality of the vehicle. Once the software-emulated ECU is generated, the electronic system can communicatively couple the software-emulated ECU to other ECUs in the electronic system, such as using a controller area network (CAN) bus.

The electronic system then can communicatively decouple the ECU from the other ECUs in the electronic system while continuing to use the eBPF probe to monitor the system calls associated with ECU. In some cases, the eBPF probe may continue to monitor the system calls of the ECU for one or more additional time windows past the particular time window. From the system calls generated during the additional time windows, the eBPF probe can determine another subset of the system calls associated with encrypting the filesystem of the ECU. If the other subset of the system calls is above another predefined threshold, the host system can be flagged as being indicative of a ransomware attack. By continuing to monitor the system calls of the ECU past the particular time window, the electronic system can confirm whether the ECU is affected by ransomware.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing system 100 for mitigating ransomware activity of a host system 102 using a kernel monitor 104 according to some aspects of the present disclosure. Components within the computing system 100 may be communicatively coupled via a network 106, such as a local area network (LAN), wide area network (WAN), the Internet, a vehicle bus, or any combination thereof. For example, the computing system 100 can include the host system 102 and an additional host system 108 that are communicatively coupled through the network 106. Examples of the host system 102 and the additional host system 108 can include a desktop computer, laptop computer, server, mobile phone, tablet, or electronic control unit (ECU). In some cases, the host system 102 and the additional host system 108 can perform operations, include storage, and transmit messages (e.g., via the network 106) to communicate with each other in the computing system 100.

The host system 102 and the additional host system 108 can each perform a respective functionality with respect to the computing system 100. For example, the host system 102 can perform a functionality 110 (e.g., database services, application hosting, etc.) based on a request generated by the computing system 100. In some implementations in which the host system 102 is an ECU, the host system 102 can be part of an electronic system used to operate a vehicle. For example, the host system 102 can include one or more modules to perform functionality 110 related to operating the vehicle by controlling one or more electrical systems or one or more electrical subsystems in the vehicle. Examples of the modules that can be part of the host system 102 can include an engine control module, a powertrain control module, a transmission control module, a brake control module, a central control module, or a body control module.

Compromising the host system 102 can affect the functionality 110 with respect to the computing system 100. Accordingly, the host system 102 may be targeted by a malicious actor using malware, such as ransomware, to gain control of or restrict access to the host system 102. For example, the malicious actor can exploit a connectivity of the host system 102 to the network 106 (e.g., the Internet) to store a ransomware file 112 in a filesystem 114 of the host system 102. In some cases, the filesystem 114 can be part of a storage system of the host system 102 that can include one or more files used by the host system 102 to perform the functionality 110. The ransomware file 112 can encrypt the filesystem 114 such that the files of the filesystem 114 are inaccessible by the host system 102 to perform the functionality 110. The malicious actor then can request a ransom from an entity associated with the host system 102 or the computing system 100 to recover access to the filesystem 114. For example, once the malicious actor receives the ransom from the entity, the malicious actor may provide a decryption key to decrypt the filesystem 114 and regain access to the files in the filesystem 114.

The host system 102 can include the kernel monitor 104 to monitor one or more system calls of the host system 102 to determine whether abnormal behavior is present in the host system 102. In some cases, the kernel monitor 104 can execute one or more kernel programs 115 in a privileged context, such as a kernel of an operating system of the host system 102. The kernel programs 115 can be software programs that can augment or enhance capabilities of the operating system of the host system 102. Additionally, the kernel programs 115 can be relatively lightweight in terms of resource usage. In some cases, the host system 102 can include a compiler (e.g., a Just-In-Time (JIT) compiler) to convert the kernel programs 115 into bytecode that can be loaded into the kernel of the host system after verifying the kernel programs 115. For example, the host system 102 additionally can include a program verifier to verify that the kernel programs 115 adhere to certain rules or restrictions (e.g., memory access restrictions) to ensure safety and security of the kernel.

In some cases, the kernel monitor 104 can attach a respective kernel program of the kernel programs 115 to a corresponding system call of the host system to monitor the system calls of the host system 102. In particular, the kernel monitor 104 can use the respective kernel program of each system call of the system calls to monitor the system calls generated by the host system 102. For example, the kernel monitor 104 may attach a particular kernel program of the kernel programs 115 at an entry of an 'open ( )' system call associated with a particular file of the filesystem 114. As a result, the kernel monitor 104 can be alerted by the particular kernel program when an operation of the host system 102 attempts to open the particular file.

The abnormal behavior can correspond to ransomware activity 116 related to encryption or decryption of the filesystem 114. Although the abnormal behavior is generally described herein as being related to encryption or decryption of the filesystem 114 caused by ransomware, other types of malware (e.g., wiper malware) may cause or contribute to the abnormal behavior. If the kernel monitor 104 determines that the system calls are associated with ransomware activity 116, the computing system 100 can implement a mitigation operation 118 to mitigate one or more effects of the ransomware activity 116. In some cases, the system calls can be referred to as syscalls.

Encrypting the filesystem 114 can involve generating one or more encryption system calls related to encryption or decryption. To determine whether the host system 102 is affected by the ransomware activity 116, the kernel monitor 104 can track a set of system calls 120 generated by the host system 102. Additionally, the kernel monitor 104 can filter the set of system calls 120 to determine a subset of system calls 122 associated with encryption or decryption. For example, the kernel monitor 104 may determine the subset of system calls 122 based on the subset of system calls 120 being associated with using an encryption library.

In some examples, the kernel monitor 104 of the host system 102 may monitor the set of system calls 120 generated within a time window 124 (e.g., minutes, hours, or days). If a quantity of the subset of system calls 122 generated within the time window 124 is above a predefined threshold 126, the subset of system calls 122 can be flagged as being indicative of abnormal behavior (e.g., the ransomware activity 116). For example, the predefined threshold 126 can involve identifying ten encryption-related system calls within a time window 124 of two hours. Accordingly, the subset of system calls 122 including more than ten encryption-related system calls can indicate that the subset of system calls 122 corresponds to the ransomware activity 116. Additionally, or alternatively, the quantity of the subset of system calls 122 being above the predefined threshold 126 can cause the kernel monitor 104 to mark the host system 102 as being associated with the ransomware activity 116. In some cases, the predefined threshold 126 can be adjusted, for example as the kernel monitor 104 is monitoring the set of system calls 120 associated with the host system 102. For example, the computing system 100 may receive instructions to increase the predefined threshold 126 based on an authorized encryption process associated with the filesystem 114.

Figure 2:
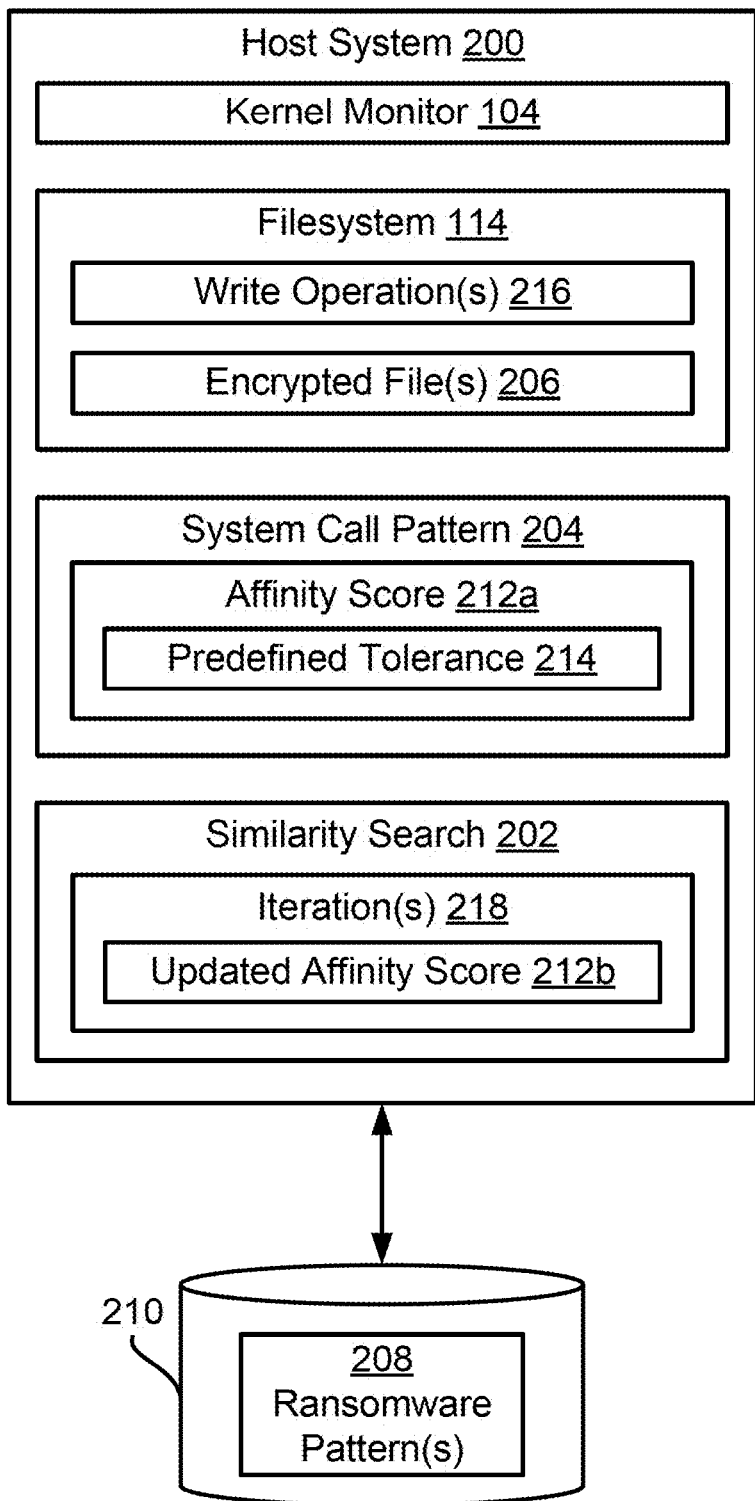
FIG. 2 is a block diagram of an example of a host system implementing a similarity search to determine whether ransomware activity has occurred in the host system according to some aspects of the present disclosure.

Additionally, or alternatively, the computing system 100 can determine whether the host system 102 is affected by the ransomware file 112 using pattern matching. For example, FIG. 2 is a block diagram of an example of a host system 200 implementing a similarity search 202 to determine whether ransomware activity 116 has occurred in the host system 200 according to some aspects of the present disclosure. In some cases, the host system 200 can correspond to the host system 102 of FIG. 1. For instance, FIG. 2 is described below with references to components of FIG. 1. The host system 200 can include a kernel monitor 104 to monitor one or more system calls of the host system 200. In some cases, the system calls monitored by the kernel monitor 104 can include the set of system calls 120 of FIG. 1.

To identify the ransomware activity 116, the kernel monitor 104 can apply pattern matching to a system call pattern 204 corresponding to the system calls generated by the host system 200. In particular, the pattern matching can involve comparing the system call pattern 204 to at least one ransomware pattern 208 corresponding to known ransomware activity. In some cases, the kernel monitor 104 can generate the system call pattern 204 using one or more attributes present in the system calls tracked by the kernel monitor 104. For example, the kernel monitor 104 may identify one or more encrypted files 206 corresponding to a subset of system calls 122 associated with encrypting a filesystem 114 of the host system 200. The encrypted files 206 can be part of the filesystem 114 and can be indicative of the ransomware activity 116, for example due to being encrypted by a ransomware file 112.

Additionally, or alternatively, the attributes of the system calls can include a rate at which the system calls are generated, a respective category of individual system calls of the system calls, or a respective software program of the host system 200 used to generate the individual system calls. Examples of the category of the system calls can include process control, file management, device management, information maintenance, communication, or protection with respect to file permissions. In some examples, the attributes of the system calls can involve whether a library (e.g., an encryption library) or an application programming interface (API) functions as an intermediary with respect to the system calls.

In some examples, the kernel monitor 104 may access the ransomware pattern 208 via a pattern database 210 storing one or more ransomware patterns. The ransomware pattern 208 can correspond to historical ransomware activity, for example by including one or more datasets generated based on historical ransomware activity. For example, if the encrypted files 206 are identified as being associated with ransomware activity 116, the encrypted files 206 can be analyzed as historical ransomware activity to improve detection of ransomware activity 116. In particular, the computing system 100 can analyze the encrypted files 206 to generate a dataset that can be used to update the ransomware pattern 208 or to generate a different ransomware pattern that can be stored in the pattern database 210. In some examples, the pattern database 210 can be updated (e.g., by the computing system 100 associated with the host system 200) to include additional ransomware patterns that can be generated based on a confirmed ransomware attack. Thus, an accuracy of the similarity search 202 with respect to identifying ransomware activity 116 can be improved over time. For example, the different ransomware pattern generated based on the encrypted files 206 can be part of the additional ransomware patterns used to update the pattern database 210.

In some examples, to implement the pattern matching, the kernel monitor 104 can apply the similarity search 202 (e.g., using a string-searching algorithm) to the system call pattern 204 with respect to the ransomware pattern 208. Examples of algorithms used to apply the similarity search 202 to the system call pattern 204 can include an Aho-Corasick algorithm or a Knuth-Morris-Pratt algorithm. The kernel monitor 104 can generate an affinity score 212a by implementing the similarity search 202 with respect to the system call pattern 204 and the ransomware pattern 208. The affinity score 212a can indicate an amount (e.g., a percentage) of similarity between the system call pattern 204 and the ransomware pattern 208. If the affinity score 212a is above a predefined tolerance 214, the kernel monitor 104 can determine that the system calls are associated with the ransomware activity 116 that can affect the host system 200. Accordingly, if the system call pattern 204 is similar to the ransomware pattern 208, the system calls may be relatively likely to correspond to or be indicative of ransomware activity 116.

Additionally, once the kernel monitor 104 determines that the affinity score 212a is above the predefined tolerance 214, the kernel monitor 104 can initiate a mitigation operation 118 to address or resolve the ransomware activity 116. In some examples, the system call pattern 204 being similar to the ransomware pattern 208 can cause the computing system 100 to implement an extended detection and response (XDR) approach to mitigate the ransomware activity 116. For example, the mitigation operation 118 can involve buffering one or more write operations 216 included in the system calls of the host system 200. In some implementations, the write operations 216 may correspond to the ransomware file 112 attempting to obtain unauthorized access to protected computing resources (e.g., the filesystem 114, encryption library, etc.) of the host system 200. By buffering the write operations 216, the kernel monitor 104 can prevent the ransomware file 112 from performing malicious operations (e.g., encrypting the filesystem 114) that can compromise the host system 200.

In some examples, the computing system 100 may buffer the write operations 216 (e.g., via the kernel monitor 104) until a buffer time window is exceeded. During the buffer time window, the kernel monitor 104 may implement one or more iterations 218 of the similarity search 202 to generate at least one updated affinity score 212*b*. In some cases, the updated affinity score 212*b* can replace a preceding affinity score, such as the affinity score 212*a*. Until the buffer time window is exceeded, the kernel monitor 103 can generate a respective updated affinity score corresponding to an interval of every nth (e.g., $2^{nd}$, $5^{th}$, $10^{th}$, etc.) iteration of the similarity search 202. The interval of generating the respective updated affinity score using the similarity search 202 can be defined using a customizable iteration variable corresponding to the kernel monitor 104. In some cases, the respective updated affinity score can be generated after each iteration of the similarity search 202.

Once the buffer time window is exceeded, the kernel monitor 104 can determine whether the updated affinity score 212*b* is below or above the predefined tolerance 214. If the updated affinity score 212*b* is below the predefined tolerance 214 once the buffer time window is exceeded, the host system 200 may be relatively unlikely to be affected by ransomware. Accordingly, the computing system 100 can flush the buffered write operations 216 by executing the buffered write operations 216. Alternatively, the updated affinity score 212*b* being above the predefined tolerance 214 once the buffer time window is exceeded can indicate that the host system 200 is relatively likely to be affected by ransomware (e.g., the ransomware file). Consequently, the kernel monitor 104 can block the write operations 216 to prevent execution of the write operations 216 that may have been generated by the ransomware (e.g., the ransomware file 112) attacking the host system 200.

Although FIG. 2 is described with respect to a single host system 200, it will be appreciated that the computing system 100 may include more than one host system (e.g., the host system 102 and the additional host system 108 of FIG. 1). In such examples, each host system of the computing system 100 can include a respective kernel monitor that can determine a respective system call pattern and a respective affinity score corresponding to each host system. The computing system 100 can use the respective kernel monitor to implement parallelism with respect to concurrently identifying and mitigating ransomware that may be located in each host system. For example, the computing system 100 may concurrently buffer respective write operations of each host system while the respective kernel monitor of each host system collects data regarding the respective affinity score of each host system.

Figure 3:
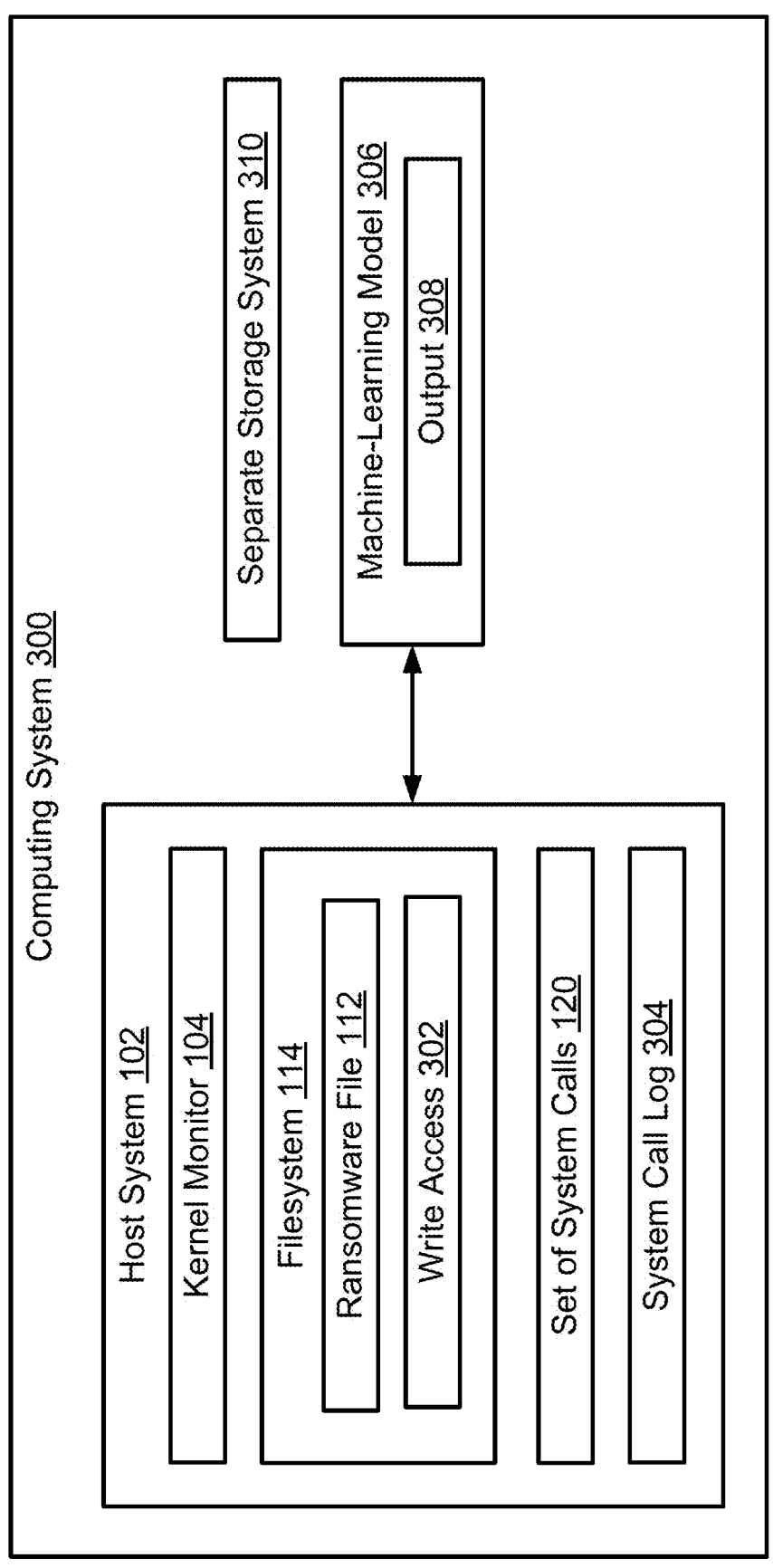
FIG. 3 is a block diagram of an example of a computing system implementing machine learning to identify a ransomware file in a filesystem of a host system in the computing system according to some aspects of the present disclosure.

In some implementations, the mitigation operation 118 may involve additional or alternative methods to mitigate the ransomware activity 116. In some examples, the mitigation operation 118 may involve isolating the ransomware file 112 such that the ransomware file 112 is unable to continue encrypting files stored in the filesystem 114 of the host system 102. For example, FIG. 3 is a block diagram of an example of a computing system 300 implementing machine learning to identify a ransomware file 112 in a filesystem 114 of a host system 102 in the computing system 300 according to some aspects of the present disclosure. Certain aspects of FIG. 3 are described with reference to components of FIG. 1. For example, the computing system 300 of FIG. 3 can correspond to the computing system 100 of FIG. 1.

The host system 102 of the computing system 300 can include a kernel monitor 104 that can monitor a set of system calls 120 associated with the host system 102. As described above with respect to FIG. 1, the kernel monitor 104 can filter the set of system calls 120 to generate a subset of system calls 122 associated with encryption or decryption of the host system 102. If the subset of system calls 122 exceeds a predefined threshold 126, the kernel monitor 104 can determine that ransomware activity 116 has occurred, for example with respect to encrypting a filesystem 114 of the host system 102. To prevent additional ransomware activity from occurring, the computing system 300 can adjust access permissions of the filesystem 114 as part of a mitigation operation 118 to mitigate the ransomware activity 116. For example, the computing system 300 may remove write access 302 to the filesystem 114 by setting the filesystem 114 as read-only. Additionally, the computing system 300 can disconnect the filesystem 114 from a network 106 (e.g., the Internet) before restarting the host system 102. In some examples, the kernel monitor 104 may continue to monitor system calls of the host system 102 while the computing system 300 implements the mitigation operation 118.

Additionally, as part of the mitigation operation 118, the computing system 300 can use the kernel monitor 104 of the host system 102 to generate a system call log 304 associated with the system calls of the host system 102. In some cases, the kernel monitor 104 may use a tracing function to track one or more system calls implemented by the host system 102. In particular, the tracing function used by the kernel monitor 104 may identify a filename and an argument list of a file executed to initiate a particular system call. For example, if the kernel monitor 104 is an eBPF probe, the kernel monitor 104 can use an execsnoop function to obtain one or more execsnoop logs that can provide information associated with historical system calls. The information in the execsnoop logs can include a usage message, a timestamp, or a combination thereof. Additionally, or alternatively, the execsnoop function can be adjusted to include failed system calls or filtered based on a filename or an argument associated with the system calls.

In some examples, the computing system 300 can provide the system call log 304 as input to a machine-learning model 306 trained to use the system call log 304 to generate an output 308 used to identify the ransomware file 112. The machine-learning model 306 can be trained through an at least partially automated (e.g., with little to no human involvement) process during which training data can be iteratively supplied to the machine-learning model 306. Using the training data, the machine-learning model 306 can identify patterns related to the training data or identify relationships between the training data and output data. For example, through training, the machine-learning model 306 can use the system call log 304 to identify the ransomware file 112 in the filesystem 114 of the host system 102. The training data can include various datasets, such as historical data from a previous ransomware attack or from previous ransomware activity.

The computing system 300 then can use the output 308 of the machine-learning model 306 to identify and isolate the ransomware file 112. In other examples, the computing system 300 may use pattern matching to identify or locate the ransomware file 112 in the filesystem 114 based on the system call log 304 before isolating the ransomware file 112. For example, the computing system 300 may isolate the ransomware file 112 by moving the ransomware file 112 from the filesystem 114 to a separate storage system 310 that is disconnected from the host system 102. In some implementations, the separate storage system 310 may be a cloud storage filesystem.

After removing the ransomware file 112 from the filesystem 114, the computing system 300 can adjust the access permissions of the filesystem 114 to restore the write access 302 with respect to the filesystem 114. The computing system 300 then can reconnect the filesystem 114 to the network 106. Additionally, the computing system 300 can identify a backup version of the host system 102 that is unaffected by the ransomware file 112. The computing system 300 then can use the backup version to restart the host system 102 such that the host system 102 can be reinstated to a system status from before the ransomware file 112 began encrypting the filesystem 114. After restarting the host system 102, the filesystem 114 of the host system 102 can be free from the ransomware file 112.

Returning to FIG. 1, another example of the mitigation operation 118 implemented by the computing system 100 can involve isolating the host system 102. In particular, the host system 102 can be replaced by a virtual host system 128 with respect to performing the functionality 110 such that the host system 102 can be isolated while minimizing impact to the overall computing system 100. The virtual host system 128 can be generated by the computing system 100 using software to emulate the host system 102. Additionally, the virtual host system 128 can operate offline, for example performing the functionality 110 while being disconnected from the network 106. Accordingly, the virtual host system 128 may be less vulnerable to ransomware compared to the host system 102 due to a lack of network connectivity. In some cases, the computing system 100 can initiate a handover process 130 once the virtual host system 128 is generated such that the virtual host system 128 can assume responsibility of the functionality 110 performed by the host system 102. Accordingly, the virtual host system 128 can replace the host system 102 with respect to performing the functionality 110.

Additionally, once the virtual host system 128 is generated, the computing system 100 can communicatively couple the virtual host system 128 to other computing components (e.g., the additional host system 108) in the computing system 100. For example, the computing system 100 may use a message-based protocol 132 as a communication protocol to enable communication between the virtual host system 128 of the other computing components in the computing system 100. In some implementations in which the computing system 100 is associated with a vehicle, the message-based protocol 132 can be a controller area network (CAN) bus. In some cases, establishing a connection between the virtual host system 128 and the message-based protocol 132 can involve using software emulation.

Once the virtual host system 128 is established to replace the host system 102, the computing system 100 can communicatively decouple the host system 102 from the other computing components in the computing system 100. For example, the host system 102 can be disconnected from the additional host system 108 such that the host system 102 is unable to use the message-based protocol 132 to communicate with the additional host system 108. In some cases, the computing system 100 can isolate the host system 102 to prevent the ransomware file 112 from spreading to or affecting the other computing components in the computing system 100. The virtual host system 128 can ensure that the computing system 100 can function (e.g., within safety or security regulations) while the host system 102 is disconnected from the other computing components in the computing system 100. For example, the host system 102 can be an ECU responsible for a brake management system of a vehicle. The virtual host system 128 can assume responsibility of performing the functionality 110 to ensure that the brake management system of the vehicle functions within suitable safety requirements while the host system 102 is unavailable. In some cases, if the host system 102 is an ECU, the virtual host system 128 may replace the host system 102 with respect to performing the functionality 110 of the vehicle until a technician or another suitable personnel can inspect the vehicle. Once the ransomware activity 116 is addressed or resolved, the host system 102 can regain control of performing the functionality 110 of the vehicle.

FIG. 4 is a block diagram of an example of a host system 400 including a first set of system calls 120a generated within a first time window 124a and a second set of system calls 120b generated within a second time window 124b according to some aspects of the present disclosure. Certain aspects of FIG. 4 are described with reference to components of FIG. 1. In some cases, the host system 400 can correspond to the host system 102 of FIG. 1.

A kernel monitor 104 of the host system 400 can monitor the first set of system calls 120a to identify ransomware activity 116 associated with the host system 400 based on a first subset of system calls 122a being above a first predefined threshold 126a. In some cases, the ransomware activity 116 (e.g., as described above with respect to FIGS. 1-4) may require additional confirmation regarding whether the ransomware activity 116 is associated with a ransomware attack 402. For example, the host system 400 being classified as having ransomware activity 116 may have a lower confidence level of being affected by ransomware compared to the host system 400 being classified as being under a ransomware attack 402. Conversely, if the host system 400 is marked as being under a ransomware attack 402, the host system 400 can be relatively likely to be affected by a ransomware file 112 or other suitable ransomware. To confirm whether the ransomware activity 116 is associated with a ransomware attack 402, the kernel monitor 104 of the host system 400 may continue to monitor additional system calls associated with the host system 400. In particular, the additional system calls can be generated by the host system 400 after the first time window 124a has been exceeded.

In some examples, the kernel monitor 104 can continue monitoring a second set of system calls 120b generated by the host system 400 within a second time window 124b that extends past the first time window 124a. For example, the second time window 124b may overlap with the first time window 124a while having a longer duration than the first time window 124a. As described above with respect to FIG. 1, the kernel monitor 104 can attach one or more kernel programs 115 to the second set of system calls 120b to observe and trace the second set of system calls 120b. In some implementations, the first time window 124a, the second time window 124b, or a combination thereof can be part of a predefined number of time windows. For instance, the kernel monitor 104 may continue to monitor system calls of the host system 102 generated within multiple time windows that collectively have a duration that extends past an ending point of the first time window 124a. In some implementations, the second set of system calls 120b can include the first set of system calls 122a generated within the first time window 124a and one or more additional system calls generated within the second time window 124b. In other implementations, the second set of system calls 120b can include the additional system calls generated within the second time window 124b while excluding the first set of system calls 120a.

The kernel monitor 104 can filter the second set of system calls 120b to identify a second subset of system calls 122b associated with encrypting the filesystem 114 of the host system 400. Similar to the first subset of system calls 122a, if the second subset of system calls 122b exceeds a second predefined threshold 126b, the second subset of system calls 122b may be indicative of a ransomware attack 402. The second predefined threshold 126b can be greater than the first predefined threshold 126a, for example due to the predefined number of time windows spanning a longer period of time compared to the first time window 124a. For instance, the first predefined threshold 126a may correspond to ten encryption-related system calls in a first time window 124a of two hours. In contrast, the second predefined threshold 126b can correspond to fifty encryption-related system calls within the predefined number of time windows that can span 24 hours. After determining that the second subset of system calls 122b exceeds the second predefined threshold 126b, the kernel monitor 104 can flag the host system 400 as being under the ransomware attack 402. Additionally, the host system 400 can initiate a mitigation operation 118, such as mitigation techniques described above with respect to FIGS. 1-3.

By continuing to monitor the host system 400 after the first time window 124a, the kernel monitor 104 can confirm whether the host system 400 is associated with the ransomware attack 402. In some examples, if the second subset of system calls 122b is below the second predefined threshold 126b, the host system 400 can be relatively unlikely to be under a ransomware attack 402. In such examples, the first subset of system calls 122a being above the first predefined threshold 126a may correspond to a false positive detection of the ransomware activity 116 by the kernel monitor 104. For example, instead of corresponding to unauthorized operations performed by the ransomware file 112, the first subset of system calls 122a can correspond to authorized encryption applied to one or more files of the filesystem 114.

While FIGS. 1-4 depicts a specific arrangement of components, other examples can include more components, fewer components, different components, or a different arrangement of the components shown in FIGS. 1-4. For instance, in other examples, a computing system (e.g., the computing system 100 of FIG. 1) may include more than one additional host system. Additionally, any component or combination of components depicted in FIGS. 1-4 can be used to implement the process(es) described herein.

Figure 5:
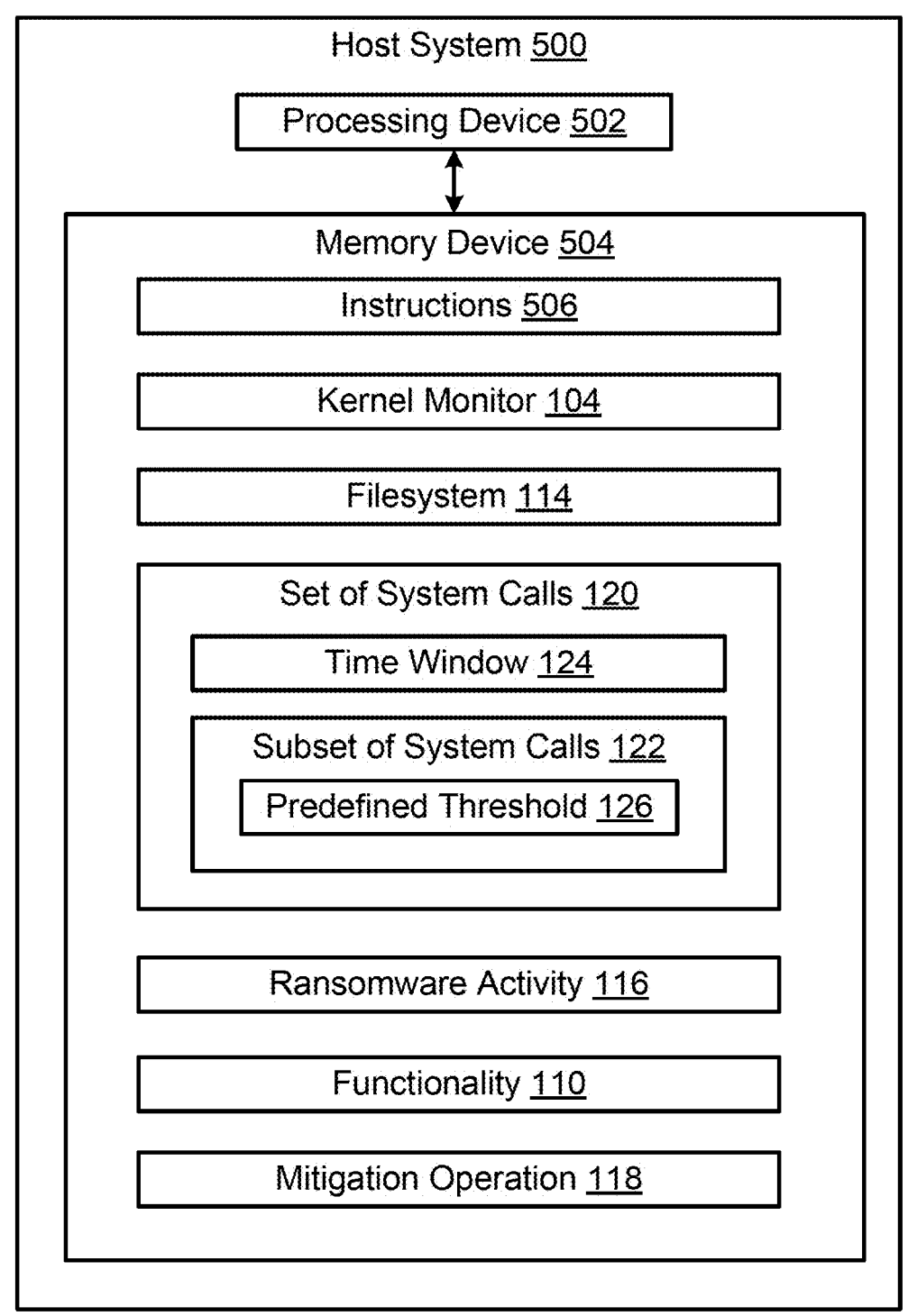
FIG. 5 is a block diagram of an example of a host system including a kernel monitor for mitigating ransomware activity of the host system according to some aspects of the present disclosure.

FIG. 5 is a block diagram of an example of a host system 500 including a kernel monitor 104 for mitigating ransomware activity 116 of the host system 500 according to some aspects of the present disclosure. The host system 500 can include a processing device 502 communicatively coupled to a memory device 504. Certain aspects of FIG. 5 are described with reference to components of FIG. 1. In some examples, the host system 500 can correspond to the host system 102 of FIG. 1.

The processing device 502 can include one processing device or multiple processing devices. The processing device 502 can be referred to as a processor. Non-limiting examples of the processing device 502 include a Field-Programmable Gate Array (FPGA), an application-specific integrated circuit (ASIC), and a microprocessor. The processing device 502 can execute instructions 506 stored in the memory device 504 to perform operations. In some examples, the instructions 506 can include processor-specific instructions generated by a compiler or an interpreter from code written in any suitable computer-programming language, such as C, C++, C#, Java, Python, or any combination of these.

The memory device 504 can include one memory device or multiple memory devices. The memory device 504 can be non-volatile and may include any type of memory device that retains stored information when powered off. Non-limiting examples of the memory device 504 include electrically erasable and programmable read-only memory (EEPROM), flash memory, or any other type of non-volatile memory. At least some of the memory device 504 includes a non-transitory computer-readable medium from which the processing device 502 can read instructions 506. A computer-readable medium can include electronic, optical, magnetic, or other storage devices capable of providing the processing device 502 with the instructions 506 or other program code. Non-limiting examples of a computer-readable medium include magnetic disk(s), memory chip(s), ROM, random-access memory (RAM), an ASIC, a configured processor, and optical storage.

In some examples, the processing device 502 can perform operations to detect and mitigate the ransomware activity 116 associated with the host system 500. For example, the processing device 502 can use the kernel monitor 104 of the host system 500 to track one or more system calls associated with the host system 500. The system calls can be generated by the host system 500 to perform a functionality 110. For example, if the host system 500 is a database server, the system calls can be generated as part of maintaining and sharing access to a database corresponding to the database server. In some cases, the processing device 502 may monitor the system calls of the host system 500 in one or more groupings based on a preset time interval, such as a time window 124. In particular, the processing device 502 may track a set of system calls 120 generated within the time window 124.

To identify whether ransomware activity 116 is present with respect to the host system 500, the processing device 502 can use the kernel monitor 104 to filter the set of system calls 120 to determine a subset of system calls 122 associated with encrypting a filesystem 114 of the host system 500. One or more files used by the host system 500 to perform the functionality 110 can be stored in the filesystem 114. If an amount of the subset of system calls 122 is above a predefined threshold 126, the processing device 502 can determine that the subset of system calls 122 Is indicative of ransomware activity 116 associated with the host system 500. Conversely, if the amount of the subset of system calls 122 is below the predefined threshold 126, the processing device 502 may continue monitoring the system calls of the host system 500 for a longer period of time than the time window 124.

In some examples, after determining that the subset of system calls 122 is indicative of the ransomware activity 116, the processing device 502 can initiate a mitigation operation 118 to mitigate the ransomware activity 116. The mitigation operation 118 can be implemented to resolve the ransomware activity 116, for example by removing ransomware responsible for the ransomware activity 116 from the host system 500. Additionally, or alternatively, the mitigation operation 118 can involve isolating the host system 500 to prevent the ransomware in the host system 500 from affecting other computing systems that are communicatively coupled to the host system 500.

FIG. 6 is a flowchart of a process 600 for mitigating ransomware activity 116 of a host system 102 using a kernel monitor 104 according to some aspects of the present disclosure. In some examples, the processing device 502 can perform one or more of the steps shown in FIG. 6. In other examples, the processing device 502 can implement more steps, fewer steps, different steps, or a different order of the steps depicted in FIG. 6. The steps of FIG. 6 are described below with reference to components discussed above in FIGS. 1-3.

In block 602, a processing device 502 of the host system 102, using a kernel monitor 104 of a host system 102, monitors a set of system calls 120 generated by the host system 102 within a time window 124 to perform a functionality 110. For example, the processing device 502 can use an extended Berkeley Packet Filter (eBPF) probe as the kernel monitor 104 to trace the set of system calls 120 by extending capabilities of a kernel associated with an operating system of the host system 102. In particular, the eBPF probe may include an eBPF program that can be executed in response to one or more events related to the set of system calls 120, enabling visibility and security monitoring with respect to system behavior of the host system 102. As an example, if the host system 102 is associated with a Linux kernel, the kernel monitor 104 may be executed when an execve system call is made by the host system 102.

In block 604, the processing device 502 filters the set of system calls 120 using the kernel monitor 104 to identify a subset of the system calls 122 associated with encrypting a filesystem 114 corresponding to the host system 102. The subset of the system calls 122 can correspond to ransomware activity 116 caused by ransomware (e.g., a ransomware file 112) that encrypts the filesystem 114 to prevent the host system 102 from performing the functionality 110. By monitoring the set of system calls 120 using the kernel monitor 104, the processing device 502 can determine one or more attributes of individual system calls of the set of system calls 120. For example, the processing device 502 can determine whether the individual system calls of the set of system calls 120 are associated with encryption or decryption of the filesystem 114. Based on the attributes of the individual system calls, the processing device 502 can filter the set of system calls 120 to determine the subset of system calls 122 related to encrypting the filesystem 114.

In block 606, the processing device 502 determines that the subset of system calls 122 is indicative of ransomware activity 116 associated with the host system 102. In particular, the processing device 502 can compare the subset of system calls 122 generated within the time window 124 to a predefined threshold 126 to determine whether the subset of system calls 122 is associated with the ransomware activity 116. For example, a quantity of the subset of system calls 122 generated within the time window 124 being above the predefined threshold 126 may indicate that a rate of encryption associated with the filesystem 114 is above a typical rate or an expected rate. In some cases, the processing device 502 may flag the subset of system calls 122 for further investigation with respect to whether the subset of system calls 122 are part of an authorized process or related to the ransomware activity 116. For example, the processing device 502 may implement pattern matching using to determine whether a system call pattern 204 corresponding to the subset of system calls 122 is relatively similar to a ransomware pattern 208 indicative of ransomware activity 116.

In block 608, subsequent to determining that the subset of the system calls 122 is indicative of the ransomware activity 116, the processing device 502 performs a mitigation operation 118 to mitigate the ransomware activity 116. In some cases, the processing device 502 can identify and remove the ransomware file 112 associated with the ransomware activity 116 as part of the mitigation operation 118. For example, the processing device 502 can provide information associated with the subset of system calls 122 as input to a machine-learning model 306 trained to generate an output 308 used to identify the ransomware file 112.

Based on the output 308 of the machine-learning model 306, the processing device 502 can locate the ransomware file 112 in the filesystem 114 of the host system 102. Additionally, the processing device 502 can remove the ransomware file 112 to a separate storage system 310 (e.g., cloud storage) that is disconnected from the host system 102 to isolate the ransomware file 112 and prevent additional ransomware activity. In additional or alternative cases, the processing device 502 can buffer one or more write operations 216 associated with the filesystem 114 as part of the mitigation operation 118 after detecting the ransomware activity 116. The write operations 216 can be part of the set of system calls 120 generated within the time window 124. Buffering the write operations 216 can prevent the ransomware file 112 from causing additional ransomware activity that may compromise security or safety associated with the host system 102.

As another example of the mitigation operation 118, the processing device 502 can initiate a handover process 130 such that a virtual host system 128 can assume responsibility of the functionality 110 to replace the host system 102. For example, the virtual host system 128 can be generated using software emulation to temporarily perform the functionality 110 in place of the host system 102 while the host system 102 is compromised by the ransomware file 112. After the virtual host system 128 takes control of performing the functionality 110, the host system 102 can be isolated to limit an impact of the ransomware file 112 on other computing systems communicatively coupled to the host system 102. Once the ransomware activity 116 is resolved (e.g., by removing the ransomware file 112 from the filesystem 114), the processing device 502 can enable the host system 102 to regain responsibility of the functionality 110.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a memory device including instructions that are executable by the processing device for causing the processing device to perform operations comprising:
monitoring, using a kernel monitor of a host system, a set of system calls generated by the host system within a time window to perform a functionality, the kernel monitor comprising a respective kernel program assigned to each system call in the set of system calls to monitor the set of system calls, wherein each kernel program of the kernel monitor is configured to alert the kernel monitor in response to an execution of a corresponding system call;

filtering, by the kernel monitor, the set of system calls to identify a subset of system calls associated with encrypting a filesystem of the host system;

determining that the subset of system calls is indicative of ransomware activity associated with the host system based on the subset of system calls exceeding a predefined threshold; and subsequent to determining that the subset of system calls is indicative of the ransomware activity, performing a mitigation operation to mitigate the ransomware activity by isolating at least a portion of the host system, the mitigation operation comprising generating a virtual host system to emulate the host system, wherein the virtual host system is configured to replace the host system to perform the functionality.

2. The system of claim 1, wherein the operation of performing the mitigation operation to mitigate the ransomware activity further comprises:

initiating a handover process configured to transfer responsibility of the functionality performed by the host system to the virtual host system, wherein the virtual host system is configured to operate offline; and subsequent to initiating the handover process configured to transfer the responsibility of the functionality performed by the host system to the virtual host system, regaining, by the host system, control of performing the functionality from the virtual host system.

3. The system of claim 1, wherein the operation of determining that the subset of system calls is indicative of the ransomware activity associated with the host system further comprises:

generating an affinity score associated with the set of system calls by applying a similarity search to compare a system call pattern corresponding to the set of system calls to a ransomware pattern corresponding to historical ransomware activity, wherein the affinity score quantifies similarity between the system call pattern and the ransomware pattern;

determining whether the affinity score is above a predefined tolerance used to control a write access to the filesystem of the host system; and in response to determining that the affinity score is above the predefined tolerance, preventing the write access to the filesystem of the host system as part of the mitigation operation to mitigate the ransomware activity.

4. The system of claim 3, wherein the operations further comprise:

buffering one or more write operations associated with the filesystem of the host system, wherein the one or more write operations are part of the set of system calls generated within the time window; and in response to determining that the affinity score is above the predefined tolerance, preventing the write access to the filesystem by blocking an execution of the one or more write operations.

5. The system of claim 1, wherein the operations further comprise, subsequent to the operation of filtering the set of system calls:

identifying an encrypted file corresponding to the subset of system calls associated with encrypting the filesystem of the host system, wherein the encrypted file is part of the filesystem of the host system and indicative of the ransomware activity; and generating a ransomware pattern based on the encrypted file, wherein the ransomware pattern is used to identify the ransomware activity.

6. The system of claim 1, wherein the predefined threshold is a first predefined threshold corresponding to a first subset of system calls generated within a first time window, and wherein the operations further comprise, subsequent to the operation of determining that the first subset of system calls exceeds the first predefined threshold:

monitoring, by the kernel monitor, a second set of system calls generated by the host system within a second time window extending past the first time window;

filtering the second set of system calls to identify a second subset of system calls associated with encrypting the filesystem of the host system;

determining that the second subset of system calls generated within the second time window exceeds a second predefined threshold indicative of a ransomware attack of the host system; and subsequent to determining that the second subset of system calls generated within the second time window exceeds the second predefined threshold, performing the mitigation operation to mitigate the ransomware attack.

7. The system of claim 1, wherein the operation of performing the mitigation operation further comprises:

providing a system call log generated by the kernel monitor as input to a machine-learning model, wherein the machine-learning model is trained to use the system call log to generate an output used to identify a ransomware file associated with the ransomware activity;

identifying, based on the output of the machine-learning model, the ransomware file stored in the filesystem; and in response to identifying the ransomware file, isolating the ransomware file by moving the ransomware file to a separate storage system, wherein the separate storage system is disconnected from the host system.

8. A method comprising:

monitoring, using a kernel monitor of a host system, a set of system calls generated by the host system within a time window to perform a functionality, the kernel monitor comprising a respective kernel program assigned to each system call in the set of system calls to monitor the set of system calls, wherein each kernel program of the kernel monitor alerts the kernel monitor in response to an execution of a corresponding system call;

filtering, by the kernel monitor, the set of system calls to identify a subset of system calls associated with encrypting a filesystem of the host system;

determining that the subset of system calls is indicative of ransomware activity associated with the host system based on the subset of system calls exceeding a predefined threshold; and subsequent to determining that the subset of system calls is indicative of the ransomware activity, performing a mitigation operation to mitigate the ransomware activity by isolating at least a portion of the host system, the mitigation operation comprising generating a virtual host system to emulate the host system, wherein the virtual host system performs the functionality in place of the host system.

9. The method of claim 8, wherein performing the mitigation operation to mitigate the ransomware activity further comprises:

initiating a handover process to transfer responsibility of the functionality performed by the host system to the virtual host system, wherein the virtual host system operates offline; and subsequent to initiating the handover process to transfer the responsibility of the functionality performed by the host system to the virtual host system, regaining, by the host system, control of performing the functionality from the virtual host system.

10. The method of claim 8, wherein determining that the subset of system calls is indicative of the ransomware activity associated with the host system further comprises:

generating an affinity score associated with the set of system calls by applying a similarity search to compare a system call pattern corresponding to the set of system calls to a ransomware pattern corresponding to historical ransomware activity, wherein the affinity score quantifies similarity between the system call pattern and the ransomware pattern;

determining whether the affinity score is above a predefined tolerance used to control a write access to the filesystem of the host system; and in response to determining that the affinity score is above the predefined tolerance, preventing the write access to the filesystem of the host system as part of the mitigation operation to mitigate the ransomware activity.

11. The method of claim 10, further comprising:

buffering one or more write operations associated with the filesystem of the host system, wherein the one or more write operations are part of the set of system calls generated within the time window; and in response to determining that the affinity score is above the predefined tolerance, preventing the write access to the filesystem by blocking an execution of the one or more write operations.

12. The method of claim 8, further comprising, subsequent to filtering the set of system calls:

identifying an encrypted file corresponding to the subset of system calls associated with encrypting the filesystem of the host system, wherein the encrypted file is part of the filesystem of the host system and indicative of the ransomware activity; and generating a ransomware pattern based on the encrypted file, wherein the ransomware pattern is used to identify the ransomware activity.

13. The method of claim 8, wherein the predefined threshold is a first predefined threshold corresponding to a first subset of system calls generated within a first time window, and wherein the method further comprise, subsequent to determining that the first subset of system calls exceeds the first predefined threshold:

monitoring, by the kernel monitor, a second set of system calls generated by the host system within a second time window extending past the first time window;

filtering the second set of system calls to identify a second subset of system calls associated with encrypting the filesystem of the host system;

determining that the second subset of system calls generated within the second time window exceeds a second predefined threshold indicative of a ransomware attack of the host system; and subsequent to determining that the second subset of system calls generated within the second time window exceeds the second predefined threshold, performing the mitigation operation to mitigate the ransomware attack.

14. The method of claim 8, wherein performing the mitigation operation further comprises:

providing a system call log generated by the kernel monitor as input to a machine-learning model, wherein the machine-learning model is trained to use the system call log to generate an output used to identify a ransomware file associated with the ransomware file;

identifying, based on the output of the machine-learning model, the ransomware file stored in the filesystem; and in response to identifying the ransomware file, isolating the ransomware file by moving the ransomware file to a separate storage system, wherein the separate storage system is disconnected from the host system.

15. A non-transitory computer-readable medium comprising program code executable by a processing device for causing the processing device to perform operations comprising:

monitoring, using a kernel monitor of a host system, a set of system calls generated by the host system within a time window to perform a functionality, the kernel monitor comprising a respective kernel program assigned to each system call in the set of system calls to monitor the set of system calls, wherein each kernel program of the kernel monitor is configured to alert the kernel monitor in response to an execution of a corresponding system call;

filtering, by the kernel monitor, the set of system calls to identify a subset of system calls associated with encrypting a filesystem of the host system;

determining that the subset of system calls is indicative of ransomware activity associated with the host system based on the subset of system calls exceeding a predefined threshold; and subsequent to determining that the subset of system calls is indicative of the ransomware activity, performing a mitigation operation to mitigate the ransomware activity by isolating at least a portion of the host system, the mitigation operation comprising generating a virtual host system to emulate the host system, wherein the virtual host system is configured to replace the host system to perform the functionality.

16. The non-transitory computer-readable medium of claim 15, wherein the operation of performing the mitigation operation to mitigate the ransomware activity further comprises:

initiating a handover process configured to transfer responsibility of the functionality performed by the host system to the virtual host system, wherein the virtual host system is configured to operate offline; and subsequent to initiating the handover process configured to transfer the responsibility of the functionality performed by the host system to the virtual host system, regaining, by the host system, control of performing the functionality from the virtual host system.

17. The non-transitory computer-readable medium of claim 15, wherein the operation of determining that the subset of system calls is indicative of the ransomware activity associated with the host system further comprises:

generating an affinity score associated with the set of system calls by applying a similarity search to compare a system call pattern corresponding to the set of system calls to a ransomware pattern corresponding to historical ransomware activity, wherein the affinity score quantifies similarity between the system call pattern and the ransomware pattern;

determining whether the affinity score is above a pre-defined tolerance used to control a write access to the filesystem of the host system; and in response to determining that the affinity score is above the predefined tolerance, preventing the write access to the filesystem of the host system as part of the mitigation operation to mitigate the ransomware activity.

18. The non-transitory computer-readable medium of claim 17, wherein the operations further comprise:

buffering one or more write operations associated with the filesystem of the host system, wherein the one or more write operations are part of the set of system calls generated within the time window; and in response to determining that the affinity score is above the predefined tolerance, preventing the write access to the filesystem by blocking an execution of the one or more write operations.

19. The non-transitory computer-readable medium of claim 15, wherein the operations further comprise, subsequent to the operation of filtering the set of system calls:

identifying an encrypted file corresponding to the subset of system calls associated with encrypting the filesystem of the host system, wherein the encrypted file is part of the filesystem of the host system and indicative of the ransomware activity; and generating a ransomware pattern based on the encrypted file, wherein the ransomware pattern is used to identify the ransomware activity.

20. The non-transitory computer-readable medium of claim 15, wherein the predefined threshold is a first predefined threshold corresponding to a first subset of system calls generated within a first time window, and wherein the operations further comprise, subsequent to the operation of determining that the first subset of system calls exceeds the first predefined threshold:

monitoring, by the kernel monitor, a second set of system calls generated by the host system within a second time window extending past the first time window;

filtering the second set of system calls to identify a second subset of system calls associated with encrypting the filesystem of the host system;

determining that the second subset of system calls generated within the second time window exceeds a second predefined threshold indicative of a ransomware attack of the host system; and subsequent to determining that the second subset of system calls generated within the second time window exceeds the second predefined threshold, performing the mitigation operation to mitigate the ransomware attack.

* * * * *